United States Patent
Abdelkader et al.

(10) Patent No.: US 12,250,132 B2
(45) Date of Patent: Mar. 11, 2025

(54) INTENT FULFILLMENT SATISFACTION

(71) Applicant: Nokia Solutions and Networks Oy, Espoo (FI)

(72) Inventors: Abdelrahman Abdelkader, Munich (DE); Stephen Mwanje, Munich (DE)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 18/557,739

(22) PCT Filed: Apr. 30, 2021

(86) PCT No.: PCT/EP2021/061387
§ 371 (c)(1),
(2) Date: Oct. 27, 2023

(87) PCT Pub. No.: WO2022/228694
PCT Pub. Date: Nov. 3, 2022

(65) Prior Publication Data
US 2024/0214287 A1    Jun. 27, 2024

(51) Int. Cl.
*H04L 43/08* (2022.01)
*H04L 43/06* (2022.01)

(52) U.S. Cl.
CPC .............. *H04L 43/08* (2013.01); *H04L 43/06* (2013.01)

(58) Field of Classification Search
CPC ................................. H04L 43/08; H04L 43/06
See application file for complete search history.

(56) References Cited

U.S. PATENT DOCUMENTS

| | | | |
|---|---|---|---|
| 10,951,509 B1* | 3/2021 | Liu | H04L 43/04 |
| 2016/0080195 A1* | 3/2016 | Ramachandran | H04L 43/065 370/220 |
| 2016/0211988 A1* | 7/2016 | Lucas | H04L 45/22 |
| 2018/0196683 A1* | 7/2018 | Radebaugh | G06F 16/245 |
| 2019/0238410 A1* | 8/2019 | Kang | H04L 41/0873 |
| 2021/0176142 A1* | 6/2021 | Clarke | H04L 41/5048 |

FOREIGN PATENT DOCUMENTS

| WO | 2021/164878 A1 | 8/2021 |
|---|---|---|
| WO | 2021/213632 A1 | 10/2021 |

OTHER PUBLICATIONS

"Update intent fulfillment tracking in information model", 3GPP TSG-SA5 Meeting #141-e, S5-221238, Agenda: 6.4.9, Nokia, Jan. 17-26, 2022, 8 pages.
International Search Report and Written Opinion received for corresponding Patent Cooperation Treaty Application No. PCT/EP2021/061387, dated Jan. 24, 2022, 12 pages.

(Continued)

*Primary Examiner* — Dhairya A Patel
*Assistant Examiner* — Sujana Khakural
(74) *Attorney, Agent, or Firm* — Robert P. Michal, Esq.; Carter, DeLuca & Farrell LLP

(57) ABSTRACT

Fulfillment of an intent which has been submitted to an intent-driven network management system is tracked. When information about fulfillment of the intent is received, a feedback report including a measurement that indicates a level of satisfaction with the fulfillment of the intent is provided.

1 Claim, 7 Drawing Sheets

(56) References Cited

OTHER PUBLICATIONS

"3rd Generation Partnership Project; Technical Specification Group Services and System Aspects; Telecommunication management; Study on scenarios for Intent driven management services for mobile networks (Release 17)", 3GPP TR 28.812, V17.1.0, Dec. 2020, pp. 1-45.

Clemm et al., "Intent-Based Networking—Concepts and Overview; draft-clemm-nmrg-dist-intent-02", Network Working Group, Internet-Draft, Jul. 8, 2019, pp. 1-21.

* cited by examiner

| Attribute Name | Description and examples | Support Qualifier |
|---|---|---|
| consumerID | ID of the consumer submitting the intent request. | M |
| intentID | ID of the intent request for which the feedback is being provided. | M |
| ServiceID | ID of the service related to the intent request if the intent relates to a specific service.<br><br>Default Value: NULL | CM |
| satisfactionLevel | Indicator of satisfaction of the fulfillment of the intent specified by Intent ID.<br>e.g. [1,10], Low/Mid/High, or [1,100], etc. | M |
| extendedFeedback | Further information provided in case the satisfaction level is below a certain threshold. Used to improve future intent fulfillments.<br><br>Default Value: NULL | O |

Fig. 4

| Attribute Name | Description and examples | Support Qualifier |
|---|---|---|
| *legacyOpList* | Legacy Operation list to achieve higher satisfaction of the specified intent for the consumer.<br><br>Default Value: NULL | O |
| *utilityFuntion* | The Utility function that was used for the satisfaction calculation<br><br>e.g. Consumer requests "Increase capacity of X slice by 50%"<br><br>Utility satisfaction function = $f(\alpha T, \beta C, \theta T\_SI)$<br>Where T is total intent execution time,<br>C is capacity after intent fulfillment,<br>T_SI is Service interruption time, and<br>$\alpha + \beta + \theta = 1$, are weights representing interest of the consumer.<br><br>Default Value: NULL | O |

Fig. 5

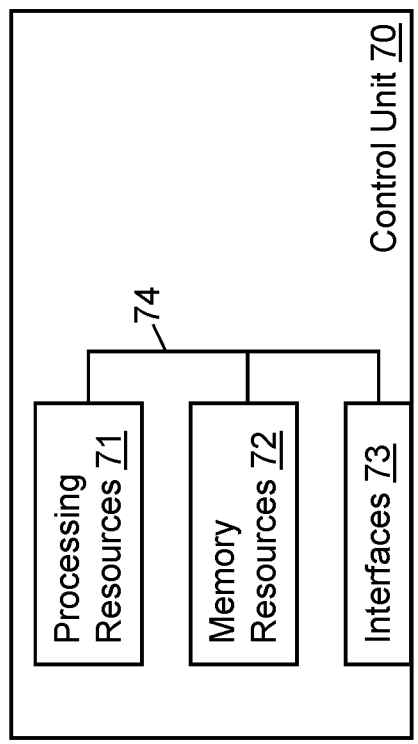

INTENT FULFILLMENT SATISFACTION

RELATED APPLICATION

This application is a national stage application, filed under 35 U.S.C. § 371, of International Patent Application No. PCT/EP2021/061387, filed on Apr. 30, 2021, the entire contents of which are incorporated herein by reference.

TECHNICAL FIELD

At least some example embodiments relate to Cognitive Autonomous Networks (CANs) in 5G networks, e.g. radio access networks, and other (e.g. future) generations of wireless/mobile networks and, specifically, the use of intents in managing networks. In particular, at least some example embodiments relate to intent fulfillment satisfaction by a consumer of an intent service.

BACKGROUND

Owing to the complexity of networks, there is always push for more automation and abstraction. One recent solution for the abstraction is through the use of intents in what may be termed Intent-Based Networking (IBN). The intent is a flexible abstract way of specifying a required outcome/goal by a consumer without specifying exactly how it should be achieved. The exact method of achieving a specified intent is left to the intent fulfillment system (IFS) offering the intent service.

Specified intents can vary from simple intents that can be fulfilled with a single command to a specific network object to very complex intents that include multiple network nodes and several commands on several network objects. Example intents may include:

Collect/get Carrier Aggregation statistics for all cells in city X.
Restrict/deny Handovers of high mobility users to small cells.
Allow load balancing to a cell Y or to small cells or to only urban cells.

LIST OF ABBREVIATIONS

| | |
|---|---|
| 5G | Fifth Generation |
| CAN | Cognitive Autonomous Networks |
| CLI | Command Line Interface |
| CM | Conditional Mandatory |
| CNM | Cognitive Network Management |
| DC | Data Collection |
| GUI | Graphical User Interface |
| IBN | Intent-Based Networking |
| IDNMS | Intent-Driven Network Management System |
| IFS | Intent Fulfillment System |
| ILL | Intent Logic Library |
| ILU | Intent Logic Unit |
| KPI | Key Performance Indicator |
| M | Mandatory |
| MOI | Managed Object Instance |
| NE | Network Element |
| NM | Network Management |
| NRM | Network Resource Management |
| O | Optional |
| OAM | Operations, Administration and Management |
| SDO | Service Data Object |

SUMMARY

At least some example embodiments aim at providing feedback from a consumer of an intent service on the satisfaction of the intent fulfillment.

According to at least some example embodiments, methods, apparatuses and non-transitory computer-readable storage media are provided as specified by the appended claims.

According to at least some example embodiments, a mechanism is provided that allows a consumer of an intent service offered by a producer to provide the consumer's degree of satisfaction with the fulfilment of said specified intent.

In the following, example embodiments will be described with reference to the accompanying drawings in which similar components are indicated using same reference signs.

BRIEF DESCRIPTION OF THE DRAWINGS

FIG. 4 shows a table illustrating a definition of attributes for an intent fulfillment feedback report according to at least some example embodiments.

FIG. 5 shows a table illustrating an extended feedback object according to at least some example embodiments.

FIG. 7 shows a schematic block diagram illustrating a configuration of a control unit in which at least some example embodiments are implementable.

DESCRIPTION OF THE EMBODIMENTS

Figure 1:
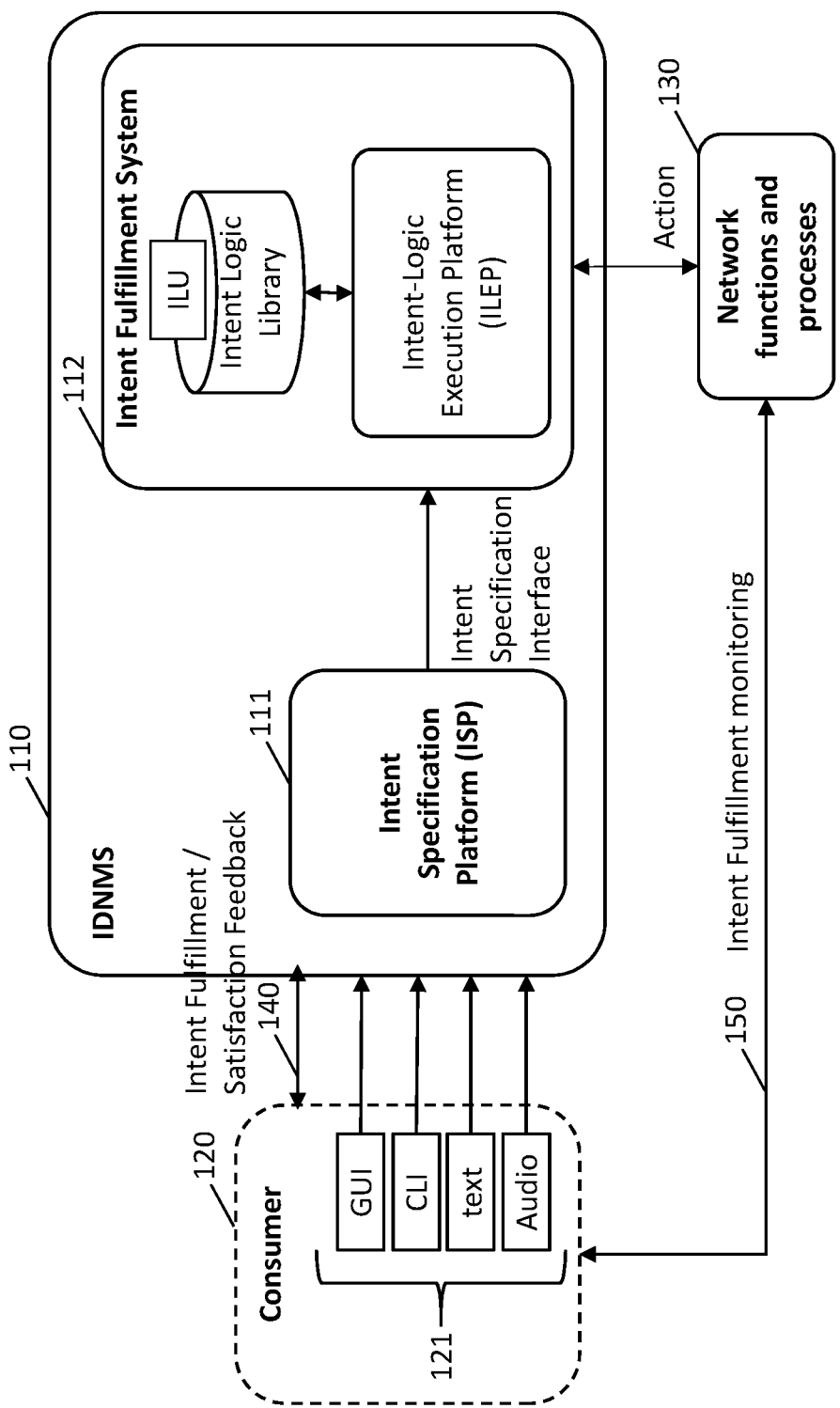
FIG. 1 shows a schematic diagram illustrating intent feedback to an Intent-Driven Network Management System (IDNMS) according to at least some example embodiments.

As shown in FIG. 1, an Intent-driven network Management System (IDNMS) 110 includes an intent specification platform 111 responsible for capturing and formatting an intent, as well as an intent fulfilment system 112 which then fulfils the formal intent. As a whole, the IDNMS 110 is seen as a black box by a consumer (which is also referred to as "consumer entity" in the following) 120 and network resources/entities (also referred to as network functions and processes) 130. The consumer 120 is enabled to interact with the IDNMS 110 through interfaces 121 defined by SDOs, e.g. legacy control operations for backwards compatibility, GUI, Command line interface, etc.

For a given intent that is submitted by the consumer 120 to be fulfilled by the IDNMS 110, the extent to which the intent is effectively fulfilled depends on many factors, among them the complexity of the task and the degree and number of alternative contexts that must be considered to the intent. Correspondingly, the achieved outcomes of the executed actions may not fully satisfy the intent consumer 120, in which case the consumer 120 may wish to inform the IDNMS 110 of this inadequate satisfaction.

The satisfaction level of fulfilling the same intent can vary between different consumers which provides valuable insight on the importance of different KPIs to each consumer. Moreover, there can always be new intents introduced by consumers which leaves room to constantly improve the system in an automated manner.

According to at least some example embodiments, a mechanism is specified that allows a consumer of an intent service offered by a producer to provide the consumer's degree of satisfaction with the fulfilment of said specified intent. For example, as will be described in more detail below, the degree of satisfaction is in the form of a simple feedback report (here also called intent fulfilment satisfaction indicator) or a detailed report that provides extra information about the consumer's expectations which is requested by the IDNMS, for example.

As shown in FIG. 1, an interface 140 between the consumer 120 and the producer/IDNMS 110 is provided to support satisfaction feedback and related requests.

In addition, according to at least some example embodiments, an interface 150 is provided between the consumer entity 120 and the network resources 130.

According to at least some example embodiments, the consumer 120 has capabilities to track the fulfillment of a previously submitted intent (intent job status—NRM MOI) e.g. using interface 140, as well as capabilities to monitor the network resources 130 affected by the outcome of the intent (DC job—NRM services) e.g. using interface 150.

According to at least some example embodiments, upon fulfillment of the intent, the consumer 120 provides a feedback report (which is also referred to as "first feedback report" in the following) including a measurement that states the degree to which the consumer 120 is satisfied with the outcome/fulfillment of the intent.

According to at least some example embodiments, a range of the intent fulfilment satisfaction indicator indicates levels of satisfaction from the lowest to the highest. Example ranges comprise sets [low, medium, High] or [1-10].

According to at least some example embodiments, when the satisfaction is inadequate then the IDNMS 110 requests for further information and hints on how to improve the intent fulfillment. For example, the IDNMS 110 asks the consumer 120 to provide a list of pseudo-operations that are normally performed (e.g. legacy network control operations, which are also referred to as "first network control operation" in the following) to achieve the needed outcome and learns therefore to improve future outputs.

According to at least some example embodiments, the consumer 120 provides further information or hints on how the intent should have been fulfilled. For example:

The consumer 120 provides a utility function that explains how the satisfaction level was computed.

The consumer 120 provides a list of pseudo-operations that are normally performed (e.g. first network control operations) to achieve the needed outcome.

According to at least some example embodiments, the IDNMS 110 provides information about the intent fulfillment with a request to the consumer 120 to provide guidance on how the fulfillment can be improved. For example, the IFS 112 shares a list of pseudo-operations (which are also referred to as "second network control operation" in the following) performed and asks the consumer 120 to review it and highlight possible wrong/non-optimal actions.

According to at least some example embodiments, the intent consumer 120 responds to a request for guidance on executed actions with an evaluation thereof. For example, the consumer 120 reviews the pseudo operations taken by the IDNMS 110 and provides an indication as to whether they were needed or not. For example, the consumer 120 also states whether the order in which the pseudo operations were taken was the expected order or not.

According to at least some example embodiments, the IDNMS 110 employs automation functions to make use of the feedback provided by the consumer 120 in improving the fulfillment system and create statistics that relates consumer satisfaction levels to relative KPIs and network states.

Figure 2C:
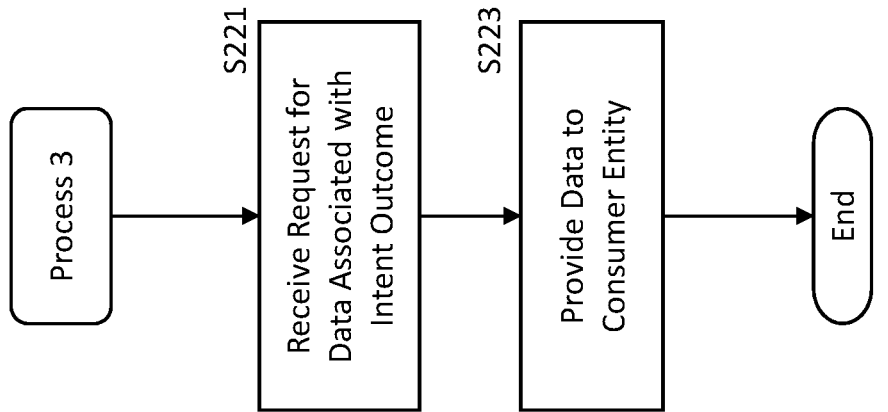
FIGS. 2A, 2B and 2C show flow charts illustrating processes according to at least some example embodiments.
Figure 2B:
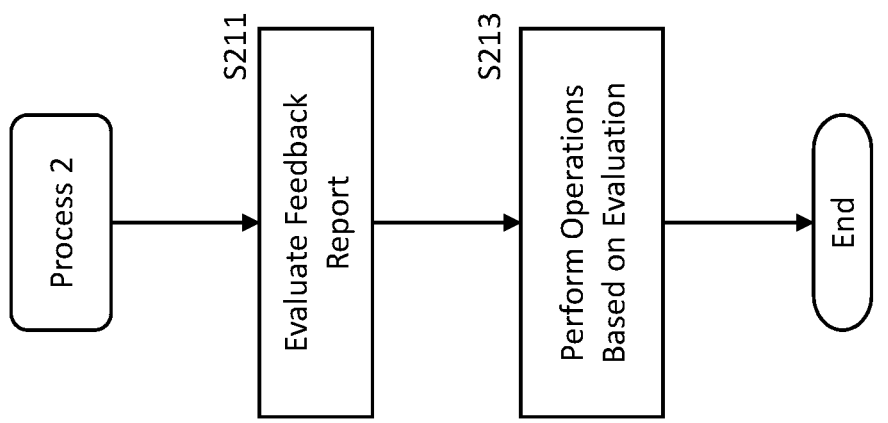
Figure 2A:
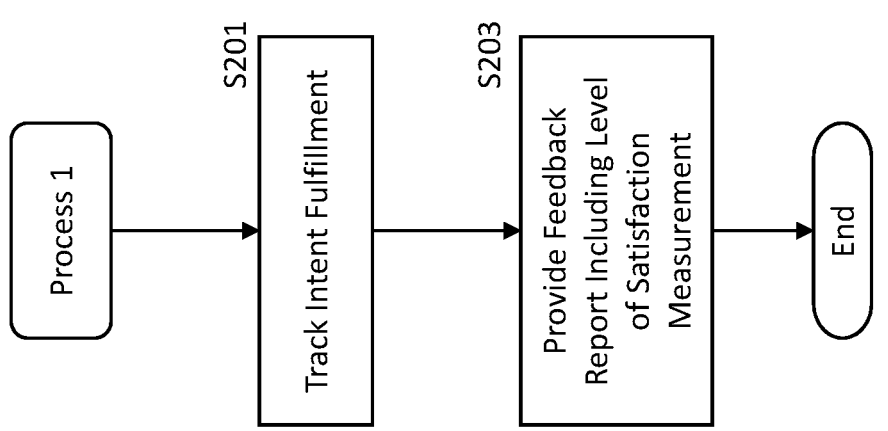

Now reference is made to the flowcharts shown in FIGS. 2A, 2B and 2B illustrating processes according to at least some example embodiments.

FIG. 2A illustrates a process 1 that is executed by consumer entity 120, for example. Process 1 is started every predetermined timing, for example.

In step S201, fulfillment of an intent which has been submitted to an intent-driven network management system (e.g. the IDNMS 110 of FIG. 1) is tracked, e.g. via interface 140 shown in FIG. 1.

In step S203, e.g. in case information about fulfillment of the intent has been received, a feedback report (e.g. first feedback report) including a measurement that indicates a level of satisfaction with the fulfillment of the intent is provided, e.g. via interface 140 shown in FIG. 1. Then process 1 ends.

According to at least some example embodiments, step S201 further includes monitoring network resources (e.g. network resources 130 of FIG. 1) which are affected by an outcome of the intent, e.g. via interface 150 shown in FIG. 1. In the feedback report of step S203, the level of satisfaction is based on the outcome of the intent, for example.

According to at least some example embodiments, step S203 further includes providing, e.g. via interface 140 shown in FIG. 1, a second feedback report which comprises at least one of the following information: an indication of first network control operations to achieve a better or higher level of satisfaction with the fulfillment of the intent, a utility function used for calculating the level of satisfaction indicated by the measurement, and a result of an evaluation of second network control operations as to whether these will achieve a better or higher level of satisfaction with the fulfillment of the intent.

FIG. 2B illustrates a process 2 that is executed by IDNMS 110, for example. Process 2 is started every predetermined timing, for example. For example, such predetermined timing comprises receipt of a feedback report, issuance of an intent fulfillment notification, etc.

In step S211, a feedback report is evaluated. The feedback report comprises at least one of the following information:
- a measurement that indicates a level of satisfaction with a fulfillment of an intent which has been submitted to an intent-driven network management system,
- an identification of a consumer entity (e.g. consumer 120 of FIG. 1) that has submitted the intent,
- an identification of the intent for which the first feedback report is being provided,
- an identification of a service related to the intent,
- an indication of first network control operations to achieve a higher level of satisfaction with the fulfillment of the intent,
- a utility function used for calculating the level of satisfaction indicated by the measurement,
- a result of an evaluation of second network control operations as to whether these will achieve a higher level of satisfaction with the fulfillment of the intent.

In step S213, operations are performed based on the evaluation of the feedback report, which improve the intent-driven network management system. Then process 2 ends.

According to at least some example embodiments, step S211 comprises evaluating a first feedback report including the measurement that indicates the level of satisfaction with the fulfillment of the intent, and at least one of the following information:
the identification of the consumer entity that has submitted the intent, the identification of the intent for which the first feedback report is being provided, the identification of the service related to the intent.

According to at least some example embodiments, step S211 comprises evaluating a second feedback report which comprises at least one of the following information:

the indication of first network control operations to achieve the higher level of satisfaction with the fulfillment of the intent, the utility function used for calculating the level of satisfaction indicated by the measurement, the result of the evaluation of second network control operations as to whether these will achieve the higher level of satisfaction with the fulfillment of the intent.

According to at least some example embodiments, the above-mentioned better or higher level of satisfaction is a level that is relatively better or higher than the previously achieved level of satisfaction, and the level of satisfaction represents a satisfaction according to the consumer's expectations.

FIG. 2C illustrates a process 3 that is executed by network resources 130, for example. Process 3 is started every predetermined timing, for example.

In step S221, a request for data associated with an outcome of an intent which has been submitted to an intent-driven network management system (e.g. IDNMS 110 of FIG. 1) is received, e.g. via interface 150 shown in FIG. 1.

In step S223, the data is provided towards a consumer entity (e.g. consumer 120 of FIG. 1) that has submitted the intent, e.g. via interface 150 shown in FIG. 1. Then process 3 ends.

Figure 3:
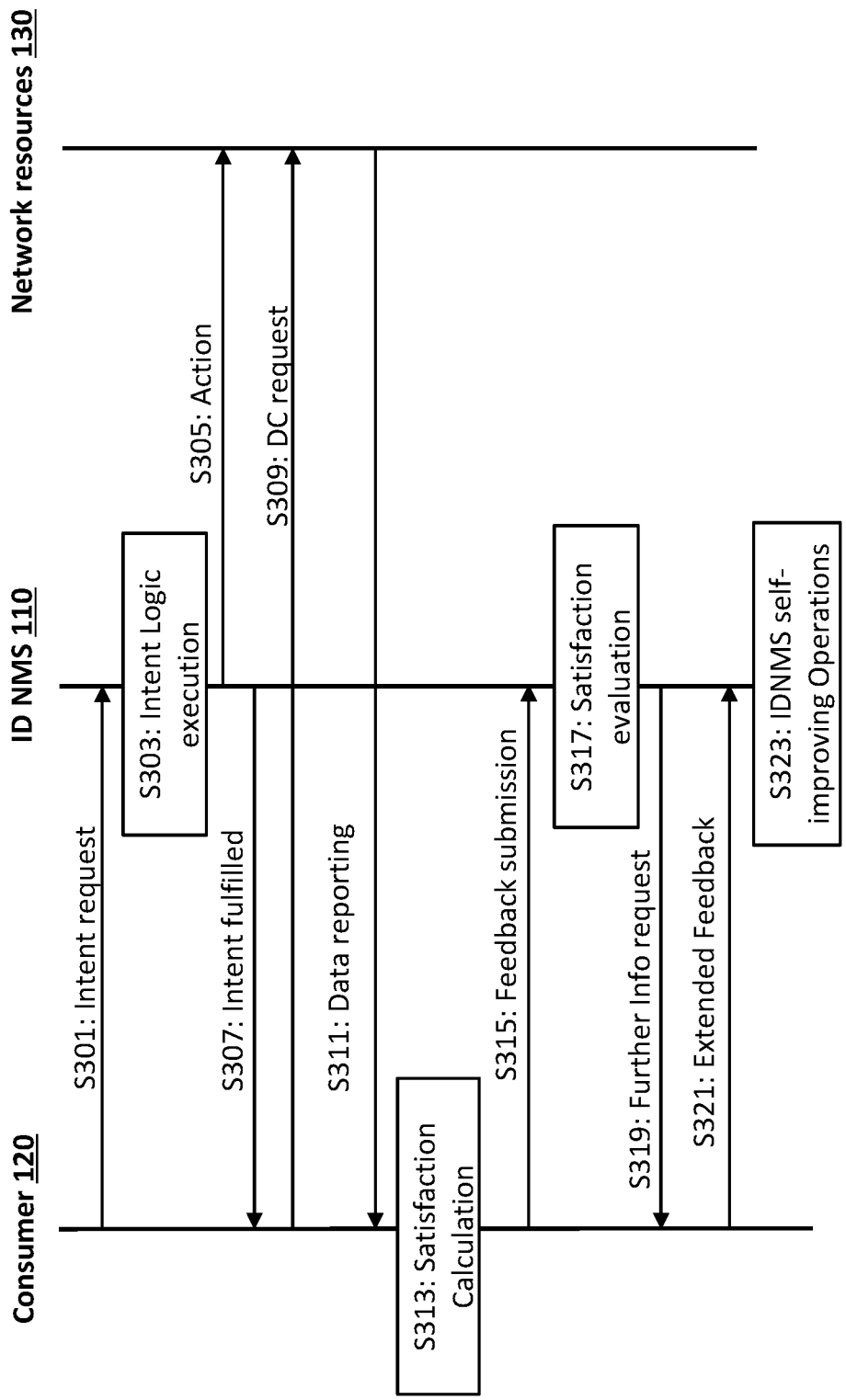
FIG. 3 shows a signaling diagram illustrating message exchange for an intent consumer producer service according to at least some example embodiments.

Now reference is made to FIG. 3 illustrating message exchange for intent request and fulfillment, as well as for objective achievement check and satisfaction calculation according to at least some example embodiments.

As seen in FIG. 3, consumer 120 of an intent service submits an intent request to IDNMS 110 through intent specification platform 111 and standardized interfaces 121 (step S301). The IDNMS 110 proceeds to fulfil the submitted intent through intent logic execution in intent fulfillment system 112 (step S303) and performs a list of actions affecting specific network resources 130 to achieve the objective of the intent (step S305). After the intent execution, the IDNMS 110 sends an intent fulfilment notification to the consumer 120 informing it that the requested intent has been fully executed (S307), or in other cases failed to execute, was partially executed, etc.

Upon receiving the intent fulfilment notification, the consumer 120 sends a data collection request to check the state of the intent objective (step S309). After gathering the relevant data, e.g. KPIs, parameters, etc. (step S311), the consumer 120 calculates its satisfaction level for the fulfillment of the intent by the IDNMS 110 (step S313). According to at least some example embodiments, this satisfaction calculation is performed based on a utility function which is at least one of consumer, intent and service specific, and takes into account relevant KPIs and aspects important for that specific consumer, intent, or service.

In the following, an example of the utility function U is described.

For example, consumer 120 requests in step S301 "Increase capacity of X slice by 50%". Utility function $U=f(\alpha \cdot T, \beta \cdot C, \theta \cdot T\_SI)$, where T is the total intent execution time, C is the relative increase in capacity after intent fulfillment, T_SI is the service interruption time, and $\alpha+\beta+\theta=1$, are weights representing interest of the consumer 120.

The intent execution time and service interruption time are evaluated relative to a reference time (of e.g. 1 second), for example, to allow for comparability of the three components. An example utility function is e.g. $U=\alpha T+\beta C+\theta T\_SI$, with $\alpha=0.2$ and $\beta=\theta=0.4$.

This utility function changes for each consumer, intent and service, and possibly results in different satisfaction levels by different consumers for the same intent, or by the same consumer and same intent for different services.

After the calculation is completed, an intent fulfillment feedback report (e.g. first feedback report) is sent to the IDNMS (step S315).

In order to gain useful insights from the feedback provided by each consumer, according to at least some example embodiments, information as illustrated in FIG. 4 is included in the intent fulfillment feedback report.

In the example shown in FIG. 4, the intent fulfillment feedback report comprises a consumerID as mandatory (M) information, which is an ID of the consumer submitting the intent request.

Further, in the example shown in FIG. 4, the intent fulfillment feedback report comprises an intentID as mandatory (M) information, which is an ID of the intent request for which the feedback is being provided.

Further, in the example shown in FIG. 4, the intent fulfillment feedback report comprises a ServiceID as conditional-mandatory (CM) information, which is an ID of the service related to the intent request if the intent relates to a specific service. For example, the default value of ServiceID is NULL.

Further, in the example shown in FIG. 4, the intent fulfillment feedback report comprises a satisfactionLevel as mandatory (M) information, which is an indicator of satisfaction of the fulfillment of the intent specified by intentID. According to at least some example embodiments, the indicator comprises numeric values, e.g. [1,10] or [1,100], a character string, e.g. Low/Mid/High, etc.

Finally, in the example shown in FIG. 4, the intent fulfillment feedback report comprises an extendedFeedback as optional (O) information, which is further information provided e.g. in case the satisfaction level is below a certain threshold. For example, this further information is used to improve future intent fulfillments. For example, the default value of extendedFeedback is NULL.

Returning to FIG. 3, message exchange with respect to further information request and extended feedback will be described.

According to at least some example embodiments, upon receiving the intent fulfillment feedback report, the IDNMS 110 evaluates the satisfaction level (step S317). If the satisfaction level is below a certain threshold, or significantly different from the average satisfaction level for this type of intent, consumer or service, a further information request is sent to the consumer 120 (step S319). The consumer 120 has to provide then an intent fulfillment report (e.g. second feedback report) with extendedFeedback information as shown in FIG. 5.

Complimentarily, according to at least some example embodiments, the IDNMS 110 provides with the request a list of logical operations (also referred to as "second network control operations") executed during the fulfillment of the intent. That way, the consumer 120 is able to review the list and highlight possible operations that resulted in a degradation of satisfaction.

In the example shown in FIG. 5, the extended feedback object comprises a legacyOpList as optional (O) information which is a legacy operation list to achieve higher satisfaction of the specified intent for the consumer. For example, the default value of legacyOpList is NULL.

Further, in the example shown in FIG. 5, the extended feedback object comprises a utilityFunction as optional (O) information which is the utility function that was used for the satisfaction calculation in step S313. An example of the utility function has been described above. For example, the default value of utilityFunction is NULL.

Returning to FIG. 3, message exchange with respect to automatic feedback analysis and system improvement will be described.

Once the IDNMS 110 receives the extendedFeedback information (step S321), it proceeds to make statistical analysis of all similar services, consumers and intents (step S323). Analyzing the utility function used in satisfaction calculation can highlight an important aspect that results in a degradation of intent fulfillment satisfaction. Moreover, correlating different services with different satisfaction levels can be an indicator that different intent fulfillment actions for different services are needed.

For example, Consumer A submits intent_1 for service_Voice "Increase capacity of X slice by 50%". After intent fulfillment, satisfaction levels are at the highest. In addition, Consumer A submits intent_2 for service_FTP "Increase capacity of X slice by 50%". After intent fulfillment, satisfaction levels are very low.

Although it is the same consumer, and the two intents are identical, satisfaction levels are very different. Upon examining the utilityFunction, it can be seen that, for service_Voice, one of the important parameters is latency, so it is important that the intent fulfillment is achieved as fast as possible and without any interruption of service. On the other hand, for service_FTP, one of the important parameters is bandwidth, so it is not important to fulfill the intent as fast, as long as the bandwidth is maintained.

This analysis can be done automatically in the IDNMS 110 combining information from multiple consumers and intent requests. After that, the findings can be used to specify new intent fulfillment actions for specific services/context combinations to better improve the consumer satisfaction levels. Moreover, this can be easily scaled for new intents as the feedback mechanism can be valuable in providing insights into new intent fulfillment system features indicating whether they are successful or not.

Figure 6:
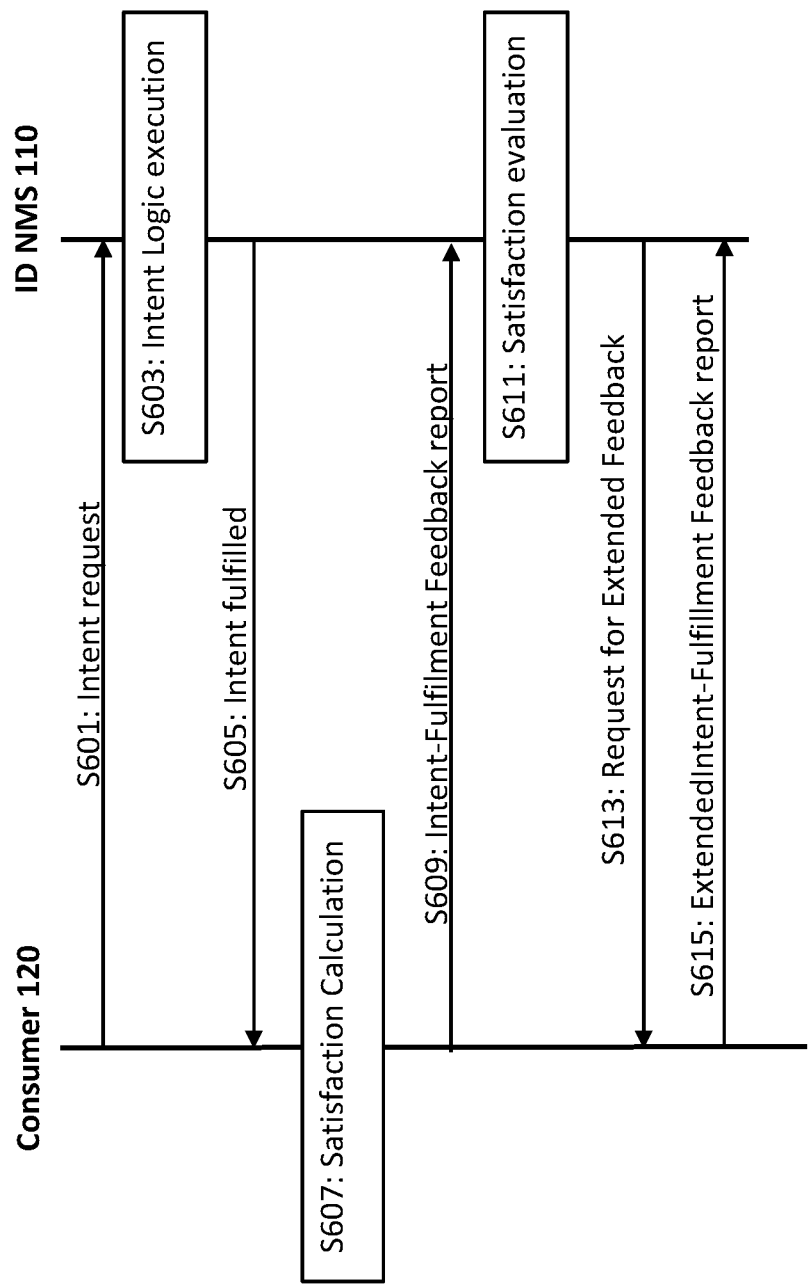
FIG. 6 shows a signaling diagram illustrating messaging according to at least some example embodiments.

FIG. 6 shows a signaling diagram illustrating signaling between consumer 120 and IDNMS 110 according to at least some example embodiments.

Processes of steps S601, S603, S605 and S607 correspond to those of steps S301, S303, S307 and S313, and description of these processes is not repeated here.

In step S609, the consumer 120 of intent driven network management services provides to the IDNMS 110 an intent-fulfilment feedback report (first feedback report) that provides details about the consumer's 120 level of satisfaction.

Processes of step S611 correspond to those of step S317, and description of these processes is not repeated here.

According to at least some example embodiments, in step S613, the IDNMS 110 requests for extended feedback from the consumer 120. For example, the request for extended feedback includes a list of logical operations that were executed by the intent fulfilment system 112.

In step S615, the consumer 120 provides to the IDNMS 110 an extended intent-fulfilment feedback report (second feedback report) that provides details about the computation of the consumer's level of satisfaction and/or hints on how the intent should have been fulfilled.

According to at least some example embodiments, the datatype for the intent-fulfilment feedback report is structured as shown in FIG. 4.

According to at least some example embodiments, the datatype for the extended intent-fulfilment feedback report is structured as shown in FIG. 5.

Now reference is made to FIG. 7 illustrating a simplified block diagram of a control unit 70 that is suitable for use in practicing at least some example embodiments. For example, several control units 70 are provided for implementing processes 1 to 3 in FIGS. 2A-C, respectively.

The control unit 70 comprises processing resources (e.g. processing circuitry) 71, memory resources (e.g. memory circuitry) 72 and interfaces (e.g. interface circuitry) 73, which are coupled via a wired or wireless connection 74.

According to an example implementation, the memory resources 72 are of any type suitable to the local technical environment and are implemented using any suitable data storage technology, such as semiconductor based memory devices, magnetic memory devices and systems, optical memory devices and systems, fixed memory and removable memory. The processing resources 71 are of any type suitable to the local technical environment, and include one or more of general purpose computers, special purpose computers, microprocessors, digital signal processors (DSPs) and processors based on a multi core processor architecture, as non-limiting examples.

According to an implementation example, the memory resources 72 comprise one or more non-transitory computer-readable storage media which store one or more programs that when executed by the processing resources 71 cause the control unit 70 to perform processes 1 to 3, respectively.

Further, as used in this application, the term "circuitry" refers to one or more or all of the following:
  (a) hardware-only circuit implementations (such as implementations in only analog and/or digital circuitry) and
  (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
  (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to at least some example embodiments, an apparatus is provided, comprising:
  means for tracking fulfillment of an intent which has been submitted to an intent-driven network management system; and
  means for receiving information about fulfillment of the intent and means for providing a first feedback report including a measurement that indicates a level of satisfaction with the fulfillment of the intent.

According to at least some example embodiments, the apparatus further comprises:
means for monitoring network resources which are affected by an outcome of the intent,
wherein the level of satisfaction is based on the outcome of the intent.

According to at least some example embodiments, the measurement that indicates the level of satisfaction comprises an indicator.

According to at least some example embodiments, the first feedback report further comprises at least one of the following information:
an identification of a consumer entity that has submitted the intent,
an identification of the intent for which the first feedback report is being provided,
an identification of a service related to the intent.

According to at least some example embodiments, the apparatus further comprises:
means for providing a second feedback report which comprises at least one of the following information:
an indication of first network control operations to achieve a higher level of satisfaction with the fulfillment of the intent,
a utility function used for calculating the level of satisfaction indicated by the measurement,
a result of an evaluation of second network control operations as to whether these will achieve a higher level of satisfaction with the fulfillment of the intent.

According to at least some example embodiments, the second feedback report is provided in case the level of satisfaction is below a certain threshold.

According to at least some example embodiments, the second feedback report is provided upon receipt of a request for the second feedback report from the intent-driven network management system.

According to at least some example embodiments, the request includes an indication of the second network control operations, the apparatus further comprising:
means for evaluating the second network control operations as to whether these will achieve a higher level of satisfaction with the fulfillment of the intent; and
means for including the result of the evaluation in the second feedback report.

According to at least some example embodiments, the apparatus further comprises:
means for receiving a notification of the fulfillment of the intent and means for requesting data associated with an outcome of the intent from network resources which are affected by the outcome of the intent; and
means for calculating the level of satisfaction based on the data.

According to at least some example embodiments, the level of satisfaction is calculated by using a utility function.

According to at least some example embodiments, the utility function is at least one of:
consumer specific,
intent specific,
service specific.

According to at least some example embodiments, an apparatus is provided, comprising:
means for evaluating a feedback report which comprises at least one of the following information:
a measurement that indicates a level of satisfaction with a fulfillment of an intent which has been submitted to an intent-driven network management system,
an identification of a consumer entity that has submitted the intent,
an identification of the intent for which the first feedback report is being provided,
an identification of a service related to the intent,
an indication of first network control operations to achieve a higher level of satisfaction with the fulfillment of the intent,
a utility function used for calculating the level of satisfaction indicated by the measurement,
a result of an evaluation of second network control operations as to whether these will achieve a higher level of satisfaction with the fulfillment of the intent; and
means for performing operations based on the evaluation of the feedback report, which improve the intent-driven network management system.

According to at least some example embodiments, the feedback report comprises a first feedback report including the measurement that indicates the level of satisfaction with the fulfillment of the intent, and at least one of the following information:
the identification of the consumer entity that has submitted the intent,
the identification of the intent for which the first feedback report is being provided,
the identification of the service related to the intent.

According to at least some example embodiments, the feedback report comprises a second feedback report which comprises at least one of the following information:
the indication of first network control operations to achieve the higher level of satisfaction with the fulfillment of the intent,
the utility function used for calculating the level of satisfaction indicated by the measurement,
the result of the evaluation of second network control operations as to whether these will achieve the higher level of satisfaction with the fulfillment of the intent.

According to at least some example embodiments, the apparatus further comprises:
means for receiving the second feedback report in case the level of satisfaction is below a certain threshold.

According to at least some example embodiments, the apparatus further comprises:
means for transmitting a request for the second feedback report.

According to at least some example embodiments, the request includes an indication of the second network control operations.

According to at least some example embodiments, the apparatus further comprises:
means for, based on the evaluation of the feedback report, creating statistics that relates the level of satisfaction to relative key performance indicators and network states of network resources which are affected by an outcome of the intent.

According to at least some example embodiments, the statistics is created over at least one of the following:
a plurality of similar services,
a plurality of similar consumers,
a plurality of similar intents.

According to at least some example embodiments, the apparatus further comprises:
means for, based on the statistics, specifying intent fulfillment actions for specific combinations out of service and context.

According to at least some example embodiments, an apparatus is provided, comprising:

means for receiving a request for data associated with an outcome of an intent which has been submitted to an intent-driven network management system; and means for providing the data towards a consumer entity that has submitted the intent.

It is to be understood that the above description is illustrative and is not to be construed as limiting. Various modifications and applications may occur to those skilled in the art without departing from the scope of as defined by the appended claims.

The invention claimed is:

1. An intent-driven network management system comprising:

at least one processor; and at least one memory including computer program code, the at least one memory and the computer program code configured to, with the at least one processor, cause the apparatus at least to:

receive a message from a user apparatus across a network indicating an intent, wherein the user apparatus includes a GUI configured for indicating the intent;

track fulfillment of the intent which has been received by the intent-driven network management system;

transmit a message to the user device across the network, including information about fulfillment of the intent;

receive by the intent-driven network management system from the user device a first feedback report including a measurement that indicates a level of satisfaction with the fulfillment of the intent, wherein the first feedback report further comprises the following information:

an identification of a consumer entity that has submitted the intent, an identification of the intent for which the first feedback report is being provided, and an identification of a service related to the intent;

transmit to the intent-driven network management system a second feedback report which comprises the following information:

an indication of first network control operations to achieve a higher level of satisfaction with the fulfillment of the intent, an identification of a utility function used for calculating the level of satisfaction indicated by the measurement, and a result of an evaluation of whether second network control operations will achieve a higher level of satisfaction with the fulfillment of the intent, and wherein the transmitting the second feedback report is based on the level of satisfaction being below a certain threshold and receipt of a request for the second feedback report from the intent-driven network management system, and wherein the request includes an indication of the second network control operations;

evaluate whether the second network control operations will achieve a higher level of satisfaction with the fulfillment of the intent, wherein the second feedback report further includes the evaluation;

transmit a notification of the fulfillment of the intent and request data associated with an outcome of the intent from network resources which are affected by the outcome of the intent; and calculate the level of satisfaction based on the request data, wherein the level of satisfaction is calculated using a utility function.

* * * * *